Sept. 26, 1950      A. H. DELOREY      2,523,649
LENS ADJUSTING TOOL
Filed April 4, 1947
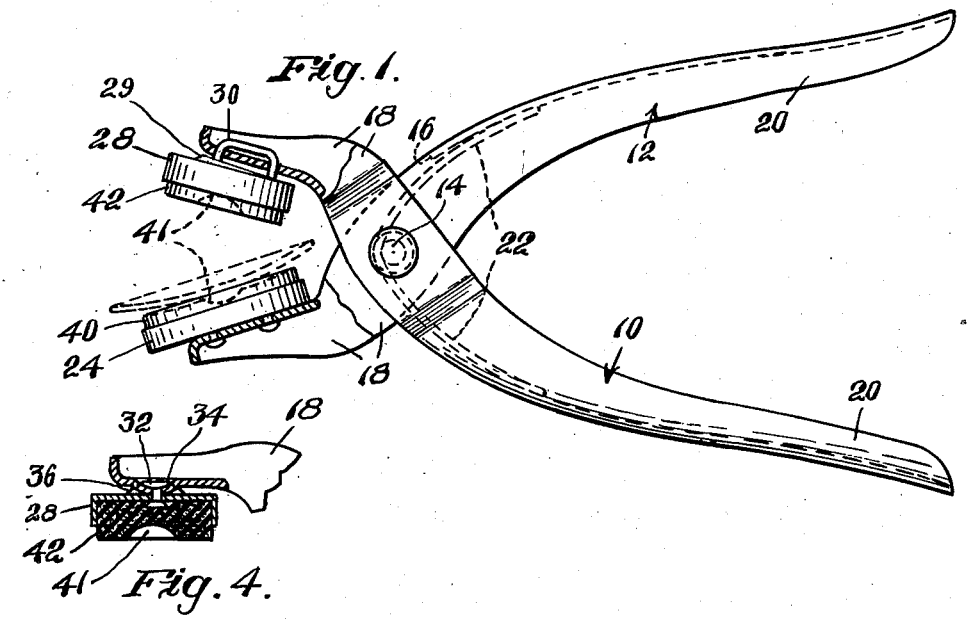
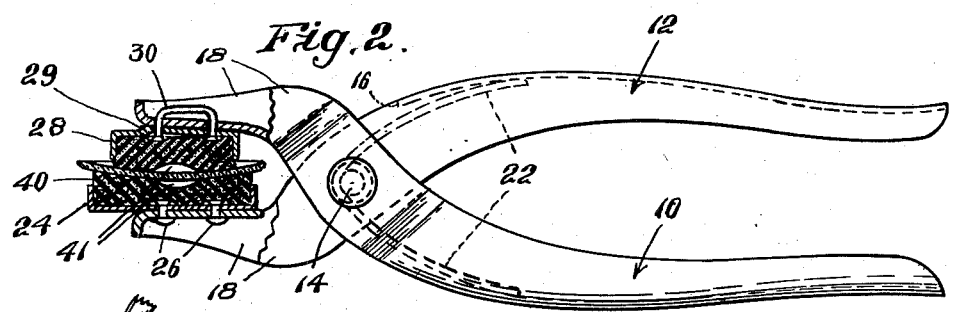
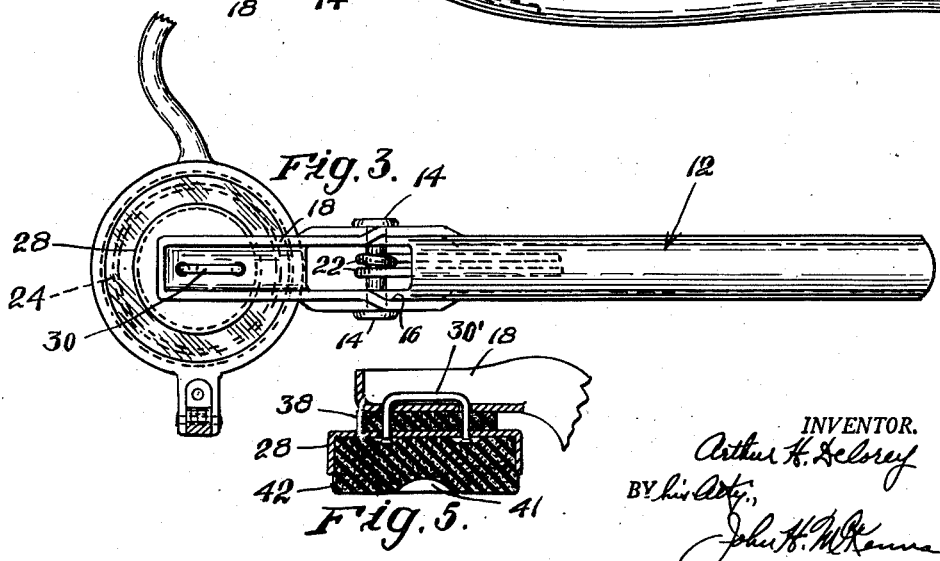
INVENTOR.
Arthur H. Delorey
BY his Atty.,
John H. McKenna Patented Sept. 26, 1950

2,523,649

UNITED STATES PATENT OFFICE 2,523,649

LENS-ADJUSTING TOOL

Arthur H. Delorey, Jamaica Plain, Mass.

Application April 4, 1947, Serial No. 739,373

4 Claims. (Cl. 81—3.6)

This invention relates to improvements in devices for adjusting an eyeglass lens in a shell type mounting frame. More particularly it provides a tool for safely gripping and easily turning a lens in its frame without any need for application of heat to the frame and without danger of fracturing the lens.

The mounting of a lens in a shell type eyeglass frame customarily is preceded by a heating of the frame rim in which the lens is to be placed, thereby to expand the rim enough so that the lens may be pressed easily into place by the fingers, after which the rim contracts, upon cooling, to securely hold the lens. Ordinarily, no attempt is made to do more than approximate a correct positioning of the lens at the time of mounting it in the heated frame rim because an accurate focusing of each lens in its frame involves a sighting of each lens through an instrument followed by any needed adjustment of the lens. The usual procedure is to properly focus the mounted lenses after a number of frames have had lenses mounted in them. Hence the frames will have cooled and contracted and any needed adjustments for proper focusing usually cannot be effected by the fingers without a reheating of the frames.

It is among the objects of the present invention to provide a lens adjusting tool with which a lens easily, quickly and accurately may be adjusted in its frame without any need for heating the frame and without danger of fracturing the lens in the act of adjustment.

Another object is to provide a lens-gripping tool wherein resilient lens-cushioning jaws are operable into lens-engaging coaction by leverage means which also provides a substantial leverage for effecting relative rotation of a lens and its mounting frame.

A further object is to provide a lens-adjusting tool having a pair of lever-actuated resilient jaws of which one jaw has a resilient cushioning body for engaging and conforming to the convex face of a lens, and the other jaw has a smaller resilient cushioning body for engaging and conforming to the concave face of the lens, the two said lens-engaging bodies fitting within the frame rim in which the lens is mounted and being rotatable in unison to rotate the lens relative to its mounting rim.

Yet another object is to provide a lens-adjusting tool wherein two coacting resilient lens-engaging jaws are mounted at the similar ends of two crossed and pivoted levers by which the jaws may be moved into and be held in lens-gripping relation, one of said jaws having smaller cross-sectional area than the other and being self-adjusting to a correct position relative to the other jaw when said jaws are brought into co-acting gripping engagement with a lens.

It is, moreover, my purpose and object generally to improve the structure and effectiveness of lens-adjusting tools, and more especially such tools designed for adjusting a lens in eyeglass frames of the shell rim general type.

In the accompanying drawing:

Fig. 1 is a side elevation of a lens handling tool embodying features of the invention;

Fig. 2 is a view generally similar to Fig. 1 but showing the resilient jaws in medial cross-section and in gripping coaction with a lens;

Fig. 3 is a top plan view of the tool of Figs. 1 and 2, with the jaws gripping a lens within an eyeglass frame; and Figs. 4 and 5 are fragmentary cross-sectional views showing modified forms of self-adjusting jaws.

Referring to the drawing, two generally similar levers 10, 12 are associated together in crossing relation and are pivotally connected by the pivot pin 14 at the region of their crossing. As herein represented, the lever 10 has a slot 16 therethrough and the lever 12 extends loosely through the slot, with the pivot pin 14 passing through the opposite walls of the slot in lever 10 and through the lever 12, the levers being shaped to simulate a pliers, each with a relatively short jaw-arm 18 and a longer hand-grip arm 20. A suitable spring 22 resiliently biases the levers in opposite directions about the pivot pin 14 so that the jaw-arms 18 are constantly biased apart to open positions.

According to the invention, one of the jaw-arms 18 has a cup-shaped member 24 rigidly mounted thereon. As herein shown in Fig. 2, the member 24 is secured to its lever arm 18 by the two rivets 26. An inverted cup-shaped member 28 is loosely connected to the other lever arm 18 so as to be self-adjusting with respect to member 24. As best seen in Fig. 2, the member 28 may be loosely secured to its lever arm 18 by the staple-shaped pin 30 whose ends are shown headed over in the cup-shaped member 28 and whose general looseness permits the member 28 to tilt on its lever arm 18. Or, the loose connection may be effected by a single rivet as at 32 in Fig. 4, with a rounded part 34 on either the member 28 or arm 18, engaged between ears 36 on the member not having the part 34, the ears preventing rotation of member 28 on its arm 18. Various other means may be employed for effecting a self-adjusting connection of member 28 to its lever arm 18, as suggested in Fig. 5 which shows a resilient cushion 38 intervening between member 28 and its lever arm 18 whereby needed relative movement of these elements can take place without any undue looseness at the securing means 30'.

Each of the cup-shaped members 24, 28 has mounted therein a substantial body of resilient material such as rubber. Preferably member 24 has larger diameter than member 28 and its body 40 of resilient material projects a substantial amount out of the cup. Similarly, the body 42 of resilient material in inverted cup 28 projects substantially out of that member. The coacting surfaces of the resilient bodies 40, 42 may be generally flat as shown, or the surface of body 40 may be slightly concave for receiving the convex face of a lens, and the surface of body 42 may be slightly convex for engaging the concave face of a lens. Also, each resilient body 40, 42 preferably is recessed, as at 41, 41, centrally of the lens-engaging surfaces, to relieve the central portion of the lens of pressure which, in the case of a lens having a thin central region, might cause a fracture.

In every case, however, the diameters of the projecting portions of the resilient bodies 40, 42 will be less than the interior diameter of the frame rim in which a lens is to be mounted, so that the lens may be gripped effectively within the frame rim to adjust it in the frame as may be required. By reason of the substantial resilient bodies 40, 42, with the body 42 in the self-adjusting inverted cup member 28, needed pressure may be applied to the lens at opposite sides thereof and over all but a relatively small marginal portion of the entire area of the lens without danger of rupturing the lens or nicking or scratching it. If the resilient body 40 has its exposed surface slightly concave, a lens may be laid thereon with the convex side thereof in the concavity of the resilient body, so that it is held in resiliently supported position as the resilient body 42 is brought into contact with the concave face of the lens.

It is a feature of the invention that the loose mounting of the inverted cup-shaped member 28 and the resilience of the substantial body 42 of rubber, or the like, therein coact in the operation of gripping a lens without application to the lens of any substantial unequal pressures of a nature which might cause a fracture. Assuming that a lens is positioned on the body 40 of the larger jaw-cup 24, as indicated by dotted lines in Fig. 1, a closing of the upper jaw toward the lower jaw first will engage the inner marginal portion of body 42 with the concave surface of the lens. As the closing movement continues, this initially engaged inner margin of body 42 yields without application of any substantial pressure to the lens, the yielding being at the loose connection of the inverted cup-shaped member 28. In other words, the inverted cup-shaped member 28 and its rubber body 42 tilt as a unit so that the complete annular margin of the rubber body 42 comes into engagement with the lens before any substantial pressure is applied to the lens. Then, as pressure is applied, the upper jaw-arm 18 of lever 10 engages flatwise against the inverted cup-shaped member 28 to substantially equalize the applied pressure annularly on the lens. As herein shown, the inverted cup-shaped member 28 has a slight projection 29 on its side which is toward lever-arm 18, and the projection 29 has an inclined surface with which the lever-arm 18 engages flatwise when pressure is being applied to a lens. Obviously, however, the lever-arm 18 may be disposed so that it will engage flatwise against the flat adjacent wall of the inverted cup-shaped member 28, if desired, in which case no projection would be needed.

It is intended that the patent shall cover, by suitable expression in the appended claims, whatever features of patentable novelty exist in the invention as disclosed.

I claim as my invention:

1. In a lens-adjusting device, two generally circular bodies of resilient material, each having diameter less than the internal diameter of the lens mounting rims of the frame of a pair of eyeglasses, and each having a generally flat lens-engaging surface, means mounting said resilient bodies in spaced generally opposed relation with said generally flat surfaces adjacent to each other, and means for moving said resilient bodies relatively toward each other thereby to grip a lens between said generally flat surfaces with the surface portion of each resilient body yieldingly conforming to the shape of the lens surface with which it is engaged, at least one of said resilient bodies being loosely connected to its mounting means whereby said loosely connected resilient body automatically adjusts itself on its mounting means to align the axes of the resilient bodies upon initial engagement of the lens and to preserve the said alignment of axes as the initial engagement of the lens is extended into a substantial gripping engagement thereof.

2. In a lens-adjusting device, a pair of levers pivoted together intermediate of their ends, a receptacle rigidly connected to an end of one of the levers, an inverted receptacle having a loose connection to the similar end of the other lever in generally opposed relation to the first mentioned receptacle, a body of resilient material secured in each of said receptacles, with each said resilient body projecting a substantial distance out of its receptacle in general direction toward the other body, and the adjacent surfaces of said resilient bodies being generally flat, said levers being operable to move said resilient bodies into gripping engagement with opposite faces of a lens with the surface portion of each resilient body yieldingly conforming to the shape of the lens surface with which it is engaged, and with said loose connection of the inverted receptacle to its lever adapted to effect aligning of the axes of the receptacles upon initial engagement of a lens and preservation of said alignment of axes as the initial engagement of a lens is extended into a substantial gripping engagement thereof 3. A lens-adjusting device for adjusting a lens in the mounting frame of a pair of eyeglasses, comprising a pair of levers in crossed relation and pivoted together at their region of crossing, a cup-shaped member rigid on an end of one of the levers and open toward the similar end of the other lever, an inverted cup-shaped member loosely connected to said similar end of the other lever and open toward the first mentioned cup, a body of resilient material filling each said cup-shaped member and projecting substantially out of its cup with a generally flat surface toward the other resilient body, said projecting portion of each resilient body having diameter less than the interior diameter of a lens mounting rim of the frame of a pair of eyeglasses, and said loosely connected inverted cup-shaped member being self-adjusting on its lever to align its axis with the axis of the cup-shaped member upon initial engagement of a lens between them and to preserve the said alignment of axes as the said members move toward each other to grip the lens, and means preventing rotation of said loosely connected inverted cup-shaped member.

4. A lens-adjusting tool comprising a pair of levers pivoted together intermediate of their ends, a pair of coacting jaws at the similar ends of the levers, each jaw having dimensions for fitting within a lens-mounting rim of the frame of a pair of eyeglasses, one of said jaws comprising a generally cup-shaped receptacle rigid on its lever and having a body of resilient material filling the receptacle and extending substantially out of the receptacle, and the other said jaw comprising a smaller inverted generally cup-shaped member movably secured to its lever for tilting thereon in several directions, and having a body of resilient material filling the cup-shaped member and extending substantially out of the member, said tiltable inverted cup-shaped member being self-adjusting into gripping engagement with a lens engaged between said resilient bodies, and means preventing rotation of the inverted cup-shaped member on its lever.

ARTHUR H. DELOREY.

REFERENCES CITED

The following references are of record in the file of this patent:

UNITED STATES PATENTS

| Number | Name | Date |
|---|---|---|
| 427,555 | Connor | May 13, 1890 |
| 949,413 | Chappell | Feb. 15, 1910 |
| 1,746,016 | Shiffman | Feb. 4, 1930 |

FOREIGN PATENTS

| Number | Country | Date |
|---|---|---|
| 642,599 | France | May 6, 1928 |